United States Patent [19]

Hickman

[11] 4,039,818
[45] Aug. 2, 1977

[54] REMOTELY POSITIONABLE MIRROR ON AN ELONGATE ARM

[75] Inventor: Ronald Price Hickman, Waltham Abbey, England

[73] Assignee: Inventec International Limited, Point Robert, Guernsey (Channel Is.)

[21] Appl. No.: 661,001

[22] Filed: Feb. 24, 1976

Related U.S. Application Data

[63] Continuation of Ser. No. 507,383, Sept. 19, 1974, abandoned.

[30] Foreign Application Priority Data

Sept. 19, 1973 United Kingdom .............. 43997/73
May 24, 1974 United Kingdom .............. 23364/74

[51] Int. Cl.² .......................... F21V 33/00; G02B 5/08
[52] U.S. Cl. .................................. 240/2.18; 240/4.2; 240/6.4 R; 350/308

[58] Field of Search ........................ 350/308; 356/241; 240/2.18, 4.2, 6.4 R

[56] References Cited

U.S. PATENT DOCUMENTS

| | | | |
|---|---|---|---|
| 1,036,000 | 8/1912 | Pease | 240/2.18 |
| 1,712,865 | 5/1929 | Allyn | 240/2.18 X |
| 1,859,682 | 5/1932 | Ranstead | 240/2.18 |
| 1,907,314 | 5/1933 | Baer | 240/2.18 |
| 2,260,597 | 10/1941 | Beattie | 74/102 |
| 2,571,964 | 10/1951 | Stevens | 240/2.18 |
| 2,652,479 | 9/1953 | Wilson | 240/2.18 |
| 2,740,882 | 4/1956 | Soucy | 240/2.18 |
| 2,929,918 | 3/1960 | Wittie | 240/2.18 |
| 3,003,397 | 10/1961 | Jacobus | 350/308 |

*Primary Examiner*—F. L. Evans

[57] ABSTRACT

A mirror has a housing containing batteries and a folding arm which carries a mirror. Adjustment mechanism extends from the housing along the arm to the mirror.

25 Claims, 9 Drawing Figures

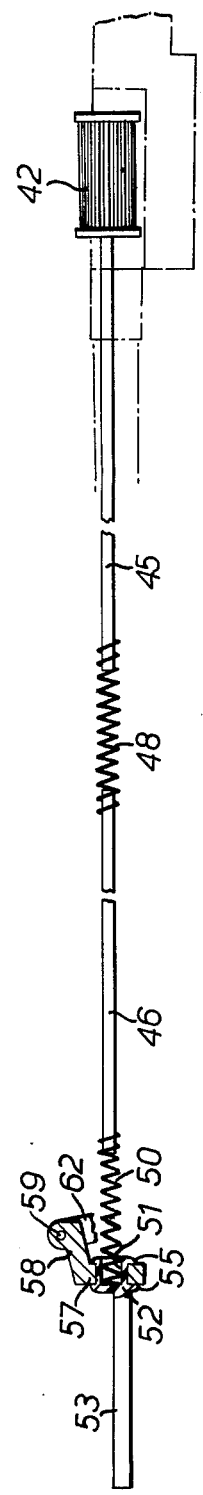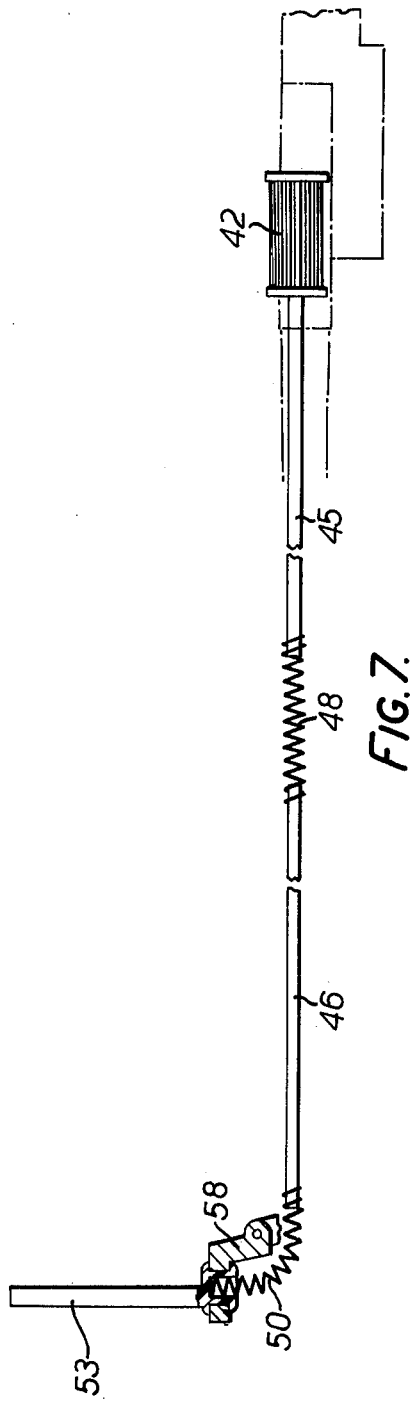

REMOTELY POSITIONABLE MIRROR ON AN ELONGATE ARM

This is a continuation of application Ser. No. 507,383 filed Sept. 19, 1974 now abandoned.

BACKGROUND OF THE INVENTION

1. Field of the Invention

This invention relates to mirror constructions, and particularly to a mirror on one end of an elongate arm, and remotely positionable from the other end thereof.

2. Description of the Prior Art

Problems are often experienced in the observation of generally inaccessible locations. For example there are many occasions in the home when it is necessary to carry out repairs or maintenance in awkward situations such as beneath furniture or under floors. Also in industry many occasions arise when it would be convenient to have a small mirror to view awkwardly placed assembly or maintenance areas.

It has been proposed in the prior art to provide enlongate arms on which adjustable mirrors are mounted. And the angle of the mirror can be adjusted from a remote end of the arm.

However these constructions are not particularly portable. The elongate arm is difficult construction to store and it could be impossible to place it in an ordinarily sized pocket since there is no provison for folding of the arm and storage of the mirror in a storage condition.

Furthermore the tilting of the mirror is restricted to a single axis so limiting the area which can be viewed without rotating the arm.

SUMMARY OF THE INVENTION

According to one aspect of the invention a mirror construction comprises an elongate body, an elongate arm one end of which is connected to the body, a mirror connected by an angleable connection to the other end of the arm, the arm and mirror being extendable between a storage condition in which the arm and mirror lie in close juxtaposition to the body and an operable condition in which the arm extends away from the body with the mirror at a distance from the body, adjustment mechanism extending along the arm to adjacent the body for adjustment of the mirror about the angleable connection, a light-emitting element positioned adjacent the mirror, and a battery carried by the body.

Preferably the mirror in the storage condition is received in and faces towards a pocket formed in the housing. The arm may lie parallel to the body in both the storage and operable conditions, and the arm is conveniently formed in a plurality of hinged sections.

According to another aspect of the invention a mirror construction comprises an arm with a mirror mounted on one end thereof for pivotal movement about two axes extending at right angles to one another and adjustment mechanism extending along the arm for moving the mirror about the two axes.

SPECIFIC DESCRIPTION

The invention may be carried into practice in a number of ways but one specific embodiment will now be described by way of example with reference to the accompanying drawings in which:

FIG. 6 shows the mirror in an untilted condition;

FIG. 7 shows the mirror in a tilted condition;

Figure 1:
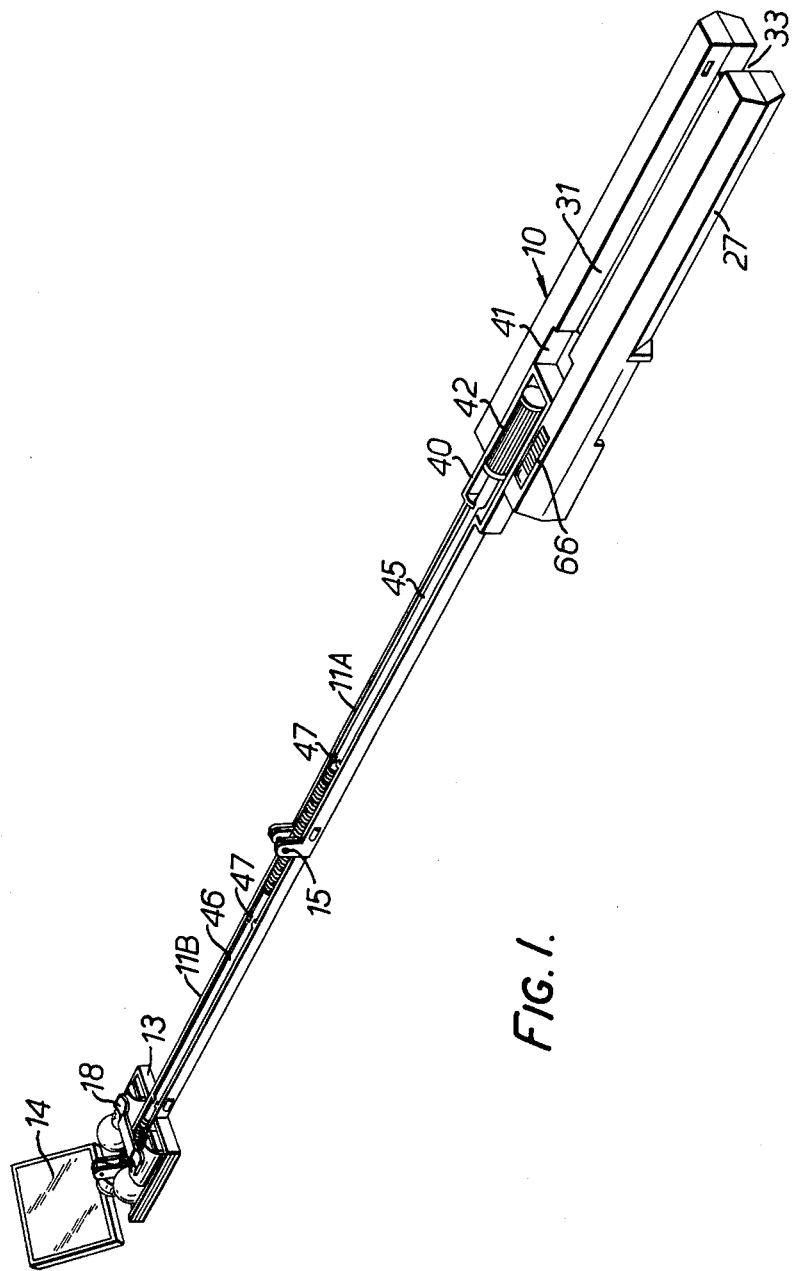
FIG. 1 is a perspective view from above and one side of a mirror in an open position according to the present invention.
Figure 5:
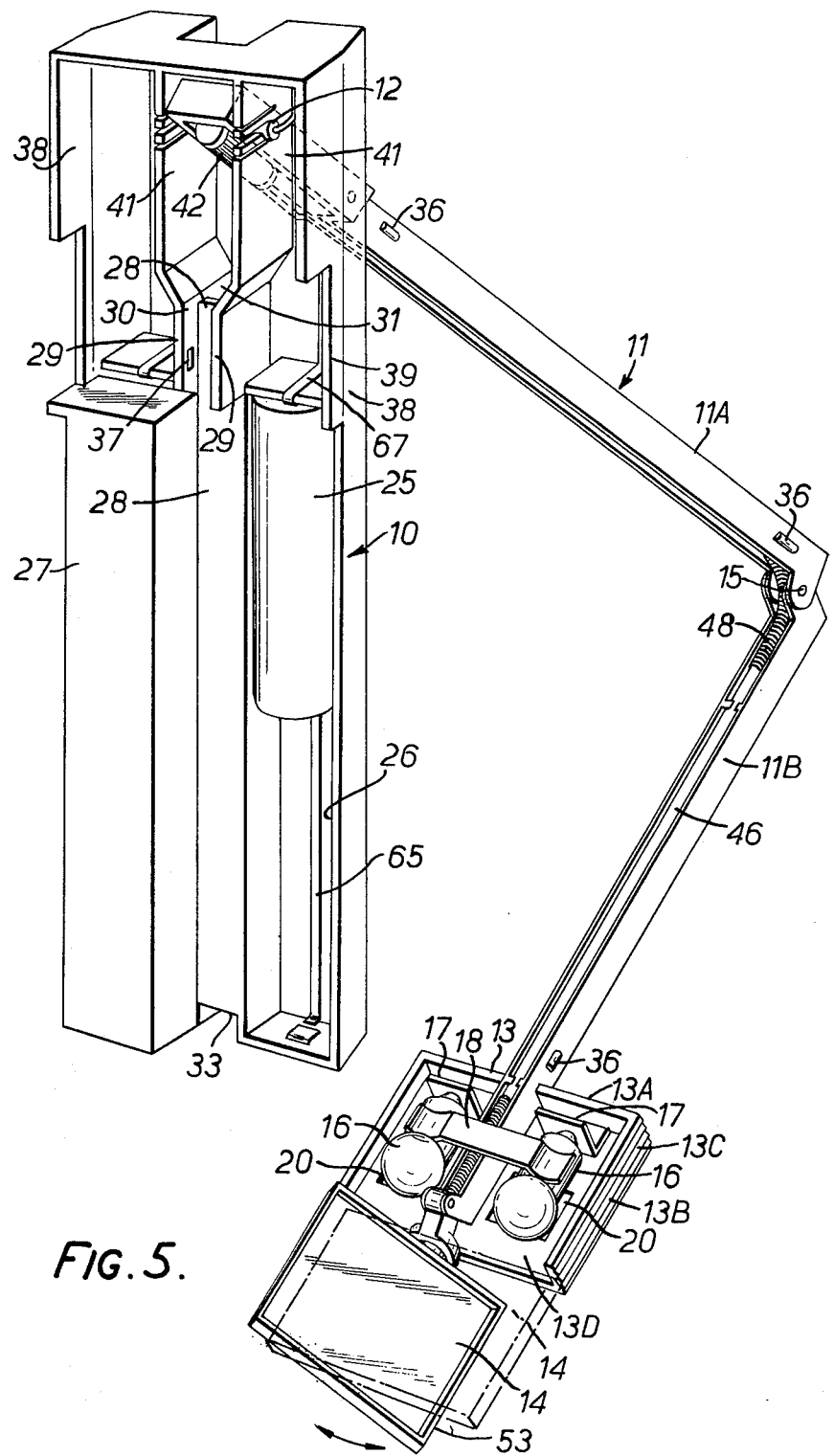
FIG. 5 is a perspective view from above and one side of the mirror in a partially folded or closed condition.
Figure 8:
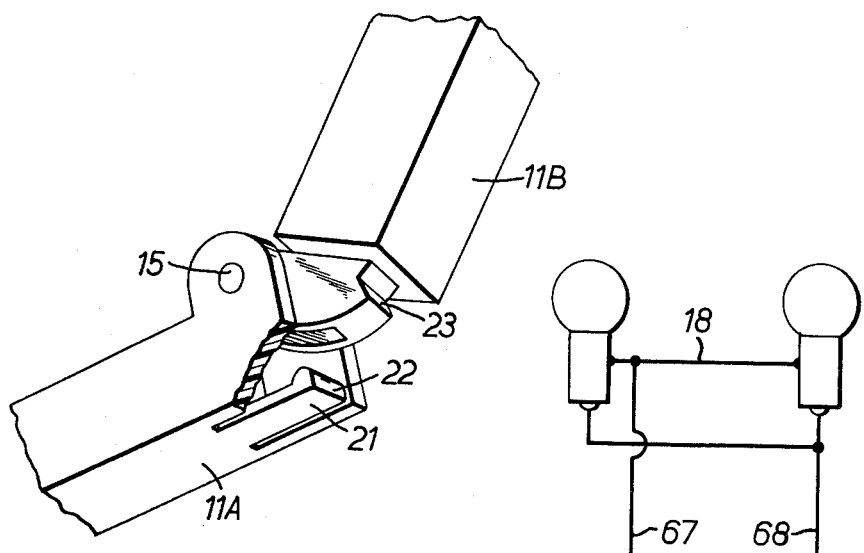
Figure 9:
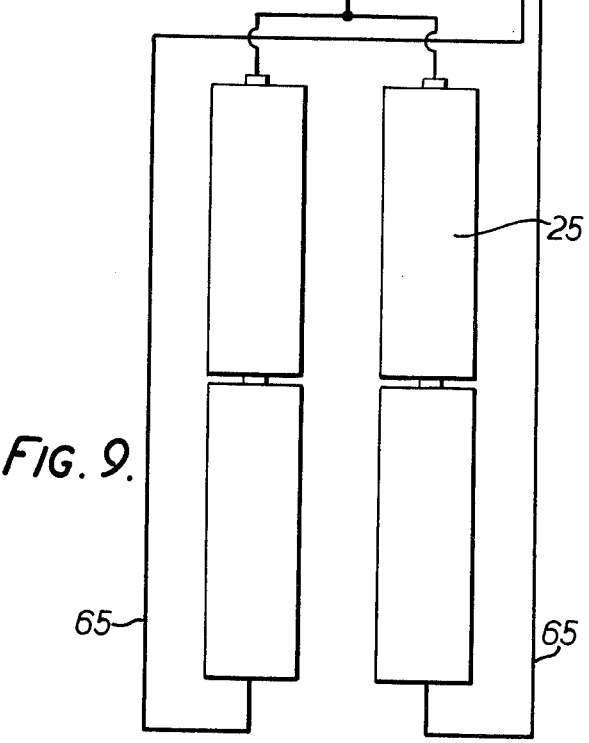

FIG. 8 is a scrap perspective view of one of the hinge connections of the arm; and FIG. 9 is a circuit diagram. The construction shown includes a housing generally indicated at 10 and formed from a number of plastics mouldings. Pivotally connected to the housing 10, by means of a hinge 12 shown in FIG. 5, is an arm generally indicated at 11. The arm is formed in two sections 11A and 11B, the former being connected to the housing 10 by the hinge 12 and the latter section 11B carrying a head 13 which includes a mirror 14 capable of adjustment in a manner to be described. The two sections 11A and 11B are formed as plastics mouldings of generally U-section and are pivoted together by a further hinge 15. The adjacent ends of the sections 11A and 11B are shown in detail in FIG. 8 from which it will be seen that the section 11A carries a tongue 21 having a hook 22 adapted to engage a recess 23 on the section 11B when the parts are in alignment as shown in FIG. 1 so as to hold the joint at the hinge 15 rigid.

Figure 4:
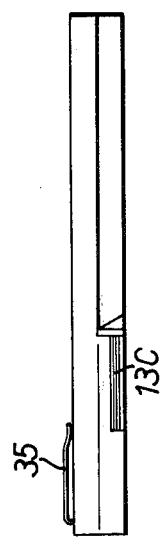
FIG. 4 is a side elevation of the mirror in a closed position.

Referring to FIG. 5, the head 13 is generally rectangular having a transverse wall 13A through which the section 11B of the arm extends. This section of the arm is rigidly connected to the head in any suitable manner, for example by interengagement of suitable plastics parts integrally formed on the arm at the head. The sides 13B of the head are formed with a number of ridges 13C to enable the mirror head 13 to be gripped between a finger and thumb when it is desired to open out the construction from the FIG. 4 position.

Extendng between the sides 13B of the head is a web 13D and mounted in the head, one on each side of the arm 11B, are a pair of lamp bulbs 16 which are retained against brackets 17 by means of a spring clip 18. Suitable power connections are made to the brackets 17 on the one hand and the spring clip 18 on the other hand to enable the lamps to be illuminated when desired. It is to be noted from FIG. 5 that the web 13D has a pair of rectangular lensed apertures 20 one for each lamp and a switch for interrupting the enables the construction to be used as an ordinary flashlight when in the FIG. 4 position.

Mounted in the housing 10 as shown in FIG. 5 are four batteries 25, only one of which is shown. The batteries are arranged in pairs one pair on each side in suitably mounted channels 26 which are covered by a pair of longitudinal lids 27 one of which has been removed in FIG. 5 for clarity of illustration.

Continuing to refer to FIG. 5, the moulding from which the housing 10 is produced affords a transverse web 28 which, adjacent the upper end of FIG. 5, is positioned between a pair of longitudinal webs 29 so as to form on each side of the web 28 a pair of channels 30 and 31. The channels are of such a width that they snugly receive the sections 11B and 11A respectively of the arm 11 when the construction is in a folded or storage condition. Thus, assuming as in FIG. 5 that the construction is being folded, the arm section 11A is about to enter the channel 31 and as the arm section 11A is folded downwards to accomplish this, the hinge connection 15 will approach a cut-out 33 in the web 28.

Figure 2:
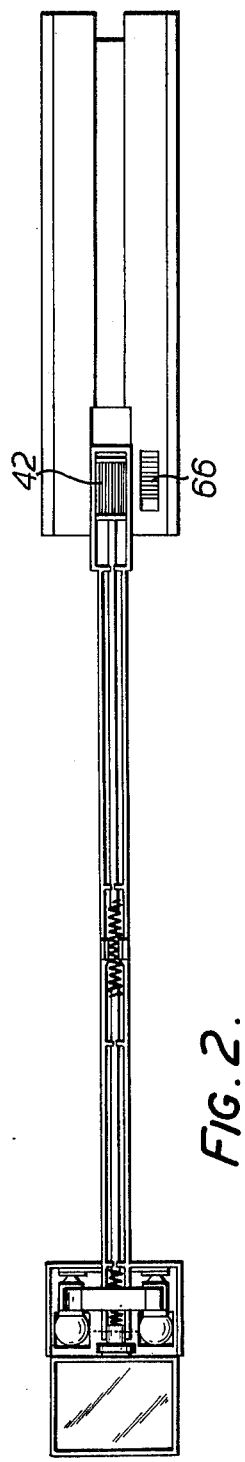
FIG. 2 is a plan view of the mirror shown in FIG. 1.
Figure 3:
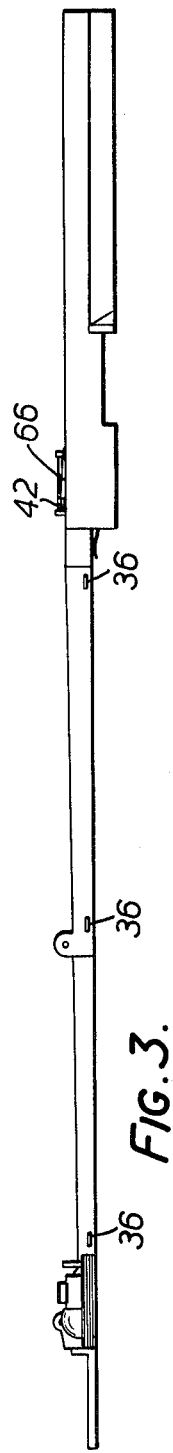
FIG. 3 is a side elevation of the mirror of FIG. 2.

This cut-out is also shown clearly on the righthand end of FIG. 1. This permits the arm section 11B to be pivoted through 180° from the extended position of FIGS. 1, 2 and 3 to the storage position of FIG. 4 in which it can be readily inserted in a pocket and retained therein by means of a spring clip 35 shown in FIG. 4. The arm sections 11A and 11B carry small integral protuberances 36 to engage recesses such as the recess 37 in order to maintain the parts lightly engaged in the storage condition.

To facilitate the snug reception of the head 13 and mirror 14 in the housing 10 it will be observed from FIG. 5 that side walls 38 of the housing are reduced in the regions 39 in order to receive the sides 13C of the head 13.

The end of the arm section 11A adjacent the hinge 12 is enlarged to form a generally rectangular box 40 as can be most clearly seen from FIG. 1. In order to receive this box of the arm 11A in the housing, the channels 30 and 31 terminate adjacent the end of the web 28 shown in FIG. 5 whereafter the walls 29 are stepped outwards to provide two further spaced walls 41 between which the box 40 is received. Means may be provided to latch the box in the open position of FIG. 1.

The box 40 provides a location for a knurled control knob 42 which can either be rotated about its longitudinal axis or be moved to and fro along this axis in order to adjust the mirror. The longitudinal movements of the knob 42 tilt the mirror upwards and downwards whilst the rotary movements move the mirror bodily about a pivot connection to be described. To transfer the longitudinal and rotary movements of the knob 42 to the mirror a longitudinal adjustment assembly extends the length of the arm 11. The adjustment assembly includes a pair of metal longitudinal split tubes 45 and 46 which are retained in the U-shaped channels forming the sections of the arm 11A and 11B by means of pairs of tongues 47. The adjacent ends of the tubes 45 and 46 are interconnected by an open-wound coil spring 48. The righthand end of the tube 45 in FIGS. 6 and 7 is connected to the adjustment knob 42. A further spring 50 extends from the lefthand end of the tube 46 into a bore 51 in a collar 52 formed as part of the plastics moulding of a mirror backing 53. The collar 52 has a pair of shoulders 55 which locate a ring 57 having an arm 58 integrally formed thereon which extends upwards and to the right in FIG. 6 and which is pivoted at 59 between a pair of ears 62 formed on the end of the arm section 11B.

The operation of this mechanism is as follows. Sliding longitudinal movement of the control knob 42 is transmitted to the collar 52 by means of the tubes 45, 46 and springs 48 and 50. For example, movement of the control knob 42 from the FIG. 6 position to the FIG. 7 position tilts the mirror progressively to any desired angle up to approximately a right angle about the pivots 59. It is possible alternatively or in addition precisely to rotate the mirror about the axis of the collar 52 by a rotary movement of the knob 42. The spring 48 will transmit rotary movement from the tube 45 to the tube 46 which in turn transmits rotary movement to the collar 52 by means of the spring 50. For this purpose the springs 48 and 50 are a tight fit on the tubes 45 and 46 and also the spring 50 is a force-fit in the collar 52. During folding of the arm sections 11A and 11B the spring 48 can move slightly outwardly of the arm sections as shown in FIG. 5 since the hinge 15 does not include a hinge pin trapping the spring.

The electric circuit for this construction is shown in FIG. 9. It includes four batteries 25 arranged in two pairs the individual batteries of a pair being in series and the pairs together being in parallel. From the negative terminals at the lower ends of the lowermost batteries leads 65 extend to a slide switch 66 mounted on the housing as can be seen from FIGS. 1, 2, and 3. From the uppermost positive terminals of the uppermost batteries a further lead 67 extends to the spring clip 18 shown in FIG. 5. From the other side of the switch 66 a further lead 68 extends to the brackets 17 shown in FIG. 5. The leads 67 and 68 are made of fine wire which can, for example, extend up the tubes 45 and 46, sufficient slack being provided, for example by way of loops or coils in the wire, to enable the wiring to accommodate changes in the overall length of the longitudinal adjustment assembly when the knob 42 is moved to and fro. If desired, one of the wires may be largely replaced by employing the arm sections 11A and 11B, together with the springs, to carry current. Alternatively, parts of the wiring can be provided in the form of printed circuits.

It is believed that the operation of the device will be clear. It is readily unfolded from its FIG. 4 position, in which the mirror faces inwardly and is thereby protected, by gripping the sides 13C of the head 13 and drawing the head 13 away from the housing 10. Thereafter, the arm sections 11A and 11B can be unfolded and latched in the open position of FIGS. 1 to 3. Thereafter, the mirror can be readily adjusted as described by longitudinal and rotary movement of the control knob 42. By using the spring 50 effectively as a universal joint these movements can be carried out simultaneously. When it is desired to close the construction to the FIG. 4 condition, the knob 42 is adjusted to get the mirror flat in the position of FIG. 3. Thereafter, the arm sections 11A and 11B are folded through the FIG. 5 position until the section 11A lies in the channel 31 of the housing and the hinge 15 is received in the cutout 33. Finally, the arm section 11B is folded into the channel 30 and latched in position. The mirror is received between the side walls 38.

If desired, the mirror may be two-sided. For example, one side may be plain and the other side curved for magnification. Additional clip-on mirrors may be incorporated as desired. Moreover, the entire mirror head can be made removable, for example by a press-fit socket to enable other mirrors to be fitted, or a damaged one to be replaced.

To maintain the mirror in any set position, friction means may be provided. As an alternative to the lamp bulbs being fixed on the arm, they can be secured to the mirror and move with it. As an alternative to positioning a pair of bulbs in the region of the mirror, it is envisaged that a single bulb could be positioned on the housing and a series of optic fibres be arranged to conduct the light to the region of the mirror.

What I claim as my invention and desire to secure by Letters Patent is:

1. A portable, remotely positionable mirror construction comprising:
   an elongate arm which can be supported from one end by a single hand;
   a mirror;
   an angleable connection connecting said mirror to the other end of said arm for rotation of said mirror with respect to said arm about two axes at right angles to one another;

a control element adjacent said one end of said arm for controlling the angular orientation of said mirror with respect to said arm, said element being operable by the same hand which supports said arm while said arm is being supported by said hand alone;

a unitary transmission means extending along the elongate arm and linking said element to said connection for transmitting control movements of said control element to said mirror so that movement of the control element with respect to said arm in a linear direction controls movement of the mirror about one of said axes, and movement of the control element in a rotational direction with respect to said arm controls movement of the mirror about the other of said axes.

2. A mirror as defined in claim 1 in which the transmission means includes an elongate rod which is translated with respect to the arm in the direction of its length by movement of the control element in said linear direction, the rod being rotated about an axis parallel to its length by movement of the control element in a direction transverse to the direction of the length of said rod.

3. A mirror as claimed in claim 2 in which the arm is formed of at least two sections which are hinged together, and the elongate rod is formed in sections one of which is carried by each arm section, the adjacent ends of said rod sections being connected together by a spring.

4. A mirror as claimed in claim 1 wherein said angleable connection includes a hinged connection between said one end of said arm and the mirror by which said mirror may be tilted about an axis perpendicular to said arm, and also includes a journal connection between said mirror of said arm by which the mirror may be rotated about an axis parallel to said arm.

5. A mirror as defined in claim 4, wherein said hinged connection includes a hinge leg connected to said arm by a pivot pin offset from the axis of said arm and perpendicular thereto, and said journal connection includes a bore formed in said hinge leg and a pintle mounted in said bore for rotation about the axis thereof.

6. A mirror as defined in claim 4, wherein said transmission means includes an elongate member supported in said arm for axial translation with respect to said arm in the direction of its length, said transmission means also includes a flexible coupling between said rod and said angleable connection for transmitting force through an angle from the direction of the axis of said elongate member and also for transmitting torque through said angle about the axis of said elongate member.

7. A mirror as defined in claim 6, in which said arm includes at least two sections and a hinge for connecting adjacent ends of said sections together, and said elongate member includes two sections and a flexible coupling between adjacent ends of said elongate member sections for transmitting force through an angle in the direction of the axis of said members and for transmitting torque through said angle about the axis of said member sections.

8. A mirror as defined in claim 1, further comprisng:
an electric circuit including a first receptor adjacent said mirror for receiving an electrically energizable light emitting element, a second receptor adjacent the other end of said arm for receiving an electric power source, and an electric current conductor between said receptors.

9. A remotely positionable mirror, comprising:
a body;
an elongate arm connected near one end thereof to said body;
a connector attached to other end of said arm and adjustable with respect to said arm about each of two transverse axes;
a mirror mounted on said connector;
adjustment means including a single hand operated device and a portion extending along said arm from said device to said connector for adjusting the orientation of said connector and said mirror with respect to said arm about both of said axis by manipulating said single hand operated device.

10. A remotely positionable mirror as defined in claim 9, further comprising:
a battery holder mounted in said body;
a lightbulb holder mounted adjacent said mirror;
electrical conductors connected between the battery holder and said lightbulb holder, and
9 witch for interupting the electrical connection between said battery holder and said light bulb holder.

11. A remotely positionable mirror, comprising:
a body;
an elongate arm connected near one end thereof to said body;
a connector attached to the other end of said arm and adjustable with respect to said arm about each of two transverse axes;
a mirror mounted on said connector;
adjustment means extending along said arm from the vicinity of said body to said connector for adjusting the orientation of said connector and said mirror with respect to said arm about said axes;
said adjustment means includes an elongate rod shiftably mounted on said arm for translation in the direction of the axis of said rod, and for angular rotation about the axis of said rod;
said connector includes a lever pivotally connected to said arm and connected to said rod, whereby said lever is rocked about its pivotal connection when said rod is shifted in the direction of its axis;
said connector also includes a socket on said lever and a pintle in said socket for rotation relative to said lever about an axis perpendicular to the axis of the pivotal connection of said lever on said arm, said pintle being connected to said adjustment means for rotation relative to said lever when said rod is rotated about its axis.

12. The remotely positionable mirror defined in claim 11, wherein:
said arm includes a plurality of sections connected together by hinge means;
said adjustment means includes a plurality of rods contained within said arm sections and connected together in the vicinity of said hinge means by universal joint means and connected to said connector by universal joint means.

13. A remotely positionable mirror, comprising:
a body;
an elongate arm connected near one end thereof to said body and formed of a plurality of hinged sections;
a connector attached to the other end of said arm and adjustable with respect to said arm about each of two transverse axes;

a mirror mounted on said connector;

adjustment means for adjusting the orientation of said connector and said mirror with respect to said arm about said axes, said adjustments means extending along said arm from the vicinity of said body to said connector and formed of a plurality of rods connected together and to said connector by universal joints.

14. A mirror construction comprising an arm formed of a plurality of hinged sections, a mirror mounted on one end of said arm for pivotal movement with respect to said arm about two axes extending at right angles to one another and an adjustment mechanism extending along the arm for moving the mirror about the two axes.

15. A mirror construction comprising an elongate body, an elongate arm one end of which is connected to the body, a mirror connected by an angleable connection to the other end of the arm, the arm and the mirror being extendable between a storage condition in which the arm and mirror lie in close juxtaposition to the body and an operable condition in which the arm extends away from the body with the mirror at a distance from the body, an adjustment mechanism extending from the mirror along the arm to adjacent the body for adjustment of the mirror about the angleable connection, and a pocket formed in the body in which the mirror in the storage condition is received.

16. A mirror construction as claimed in claim 15 in which the arm is longer than the body.

17. A mirror construction comprising an elongate body, an elongate arm one end of which is connected to the body, the arm being formed of a plurality of hinged sections, a mirror connected by an angleable connection to the other end of the arm, the arm and mirror being extendable between a storage condition in which the arm and mirror lie in close juxtaposition to the body and an operable condition in which the arm extends away from the body with the mirror at a distance from the body, an adjustment mechanism extending from the mirror along the arm to adjacent the body for adjustment of the mirror about the angleable connection.

18. A mirror construction as claimed in claim 17 in which the arm is received in one or more channels in the body.

19. A mirror construction as claimed in claim 17 in which one arm section is received in a channel on one side of the body and another arm section is received in a second channel on the opposite side of the body.

20. A mirror construction as claimed in claim 17 in which the arm has a first section of which one end is pivoted to the body and which section has a length such that, in the storage condition, its other end lies close to the other end of the body to permit a second section pivoted to the said second end of the first section to be pivoted through substantially 180° with respect to the first section and to lie on the opposite side of the body from the first section in the storage condition.

21. A mirror construction comprising an elongate body, an elongate arm one end of which is connected to the body, a mirror connected to the other end of the arm by an angleable connection which permits rotation of the mirror relative to the arm about two axes lying normal to one another, the arm and mirror being extendable between a storage condition in which the arm and mirror lie in close juxtaposition to the body and an operable condition in which the arm extends away from the body with the mirror at a distance from the body, an adjustment mechanism extending from the mirror along the arm to adjacent the body for adjustment of the mirror about the angleable connection.

22. A mirror as claimed in claim 21 in which a single control element effects movement of the mirror about both axes simultaneously or independently.

23. A mirror construction as in claim 22 wherein the single control element is connected to the mirror by said adjustment mechanism which includes a plurality of rod members interconnected to each other and to the mirror by means of springs 24. A mirror as claimed in claim 21 in which part of the adjustment mechanism is a coil spring.

25. A mirror construction comprising a housing which includes a pair of longitudinal compartments separated by a centrally positioned web which, with the compartments, defines a pair of outwardly facing channels one on each side of the housing, an arm having one section thereof which is connected to the housing by a pivot connection and which in a storage condition lies in one of the channels, a second section having one end pivoted to the end of the first section remote from the pivot connection, and the other end of the second section having a mirror mounted thereon for pivotal movement about at least one axis, and a mirror adjustment mechanism extending from adjacent the housing through the arm sections to the mirror.

* * * * *

UNITED STATES PATENT AND TRADEMARK OFFICE
CERTIFICATE OF CORRECTION

PATENT NO. : 4,039,818
DATED : August 2, 1977
INVENTOR(S) : Ronald Price Hickman It is certified that error appears in the above-identified patent and that said Letters Patent are hereby corrected as shown below:

NOTE: The firm of Brumbaugh, Graves, Donohue & Raymond is not listed on the first page of the patent between Item [56] and Item [57].

Column 1, lines 21 & 22, "enlongate" should read --elongate--;
Column 1, line 23, "And" should be --and--;
Column 1, line 26, after "is" insert --a--;
Column 2, line 10, "The construction" should start a new paragraph;
Column 2, line 36, delete "a";
Column 2, line 38, "Extendng" should be --Extending--;
Column 2, lines 46 & 47, "and a switch for interrupting the" should be --which--;
Column 2, lines 47-49 should begin at the left margin;
Column 5, line 64, "comprisng" should read --comprising--;
Column 6, line 15, "axis" should be --axes--;
Column 6, line 23, "9 witch for interupting" should read --a switch for interrupting--;
Column 6, line 24, "light bulb" should read --lightbulb--; and
Column 7, line 4, "adjustments" should read --adjustment--.

Signed and Sealed this

Twenty-second Day of November 1977

[SEAL]

Attest:

RUTH C. MASON
*Attesting Officer*

LUTRELLE F. PARKER
*Acting Commissioner of Patents and Trademarks*